United States Patent [19]

Tschirren et al.

[11] 4,357,106

[45] Nov. 2, 1982

[54] PROCESS AND DEVICE FOR THE OPTICAL MEASUREMENT OF TEMPERATURE AND PROCESS FOR THE PRODUCTION OF A SUITABLE PROBE

[76] Inventors: Jean D. Tschirren, Grassiliere 12, 2016 Cortaillod; Gilbert C. Widmer, Pont-de-Vaux 8, 2525 Le Landeron; Jean-Paul Pellaux, Petits Chenes 2, 2000 Neuchatel, all of Switzerland; André Coche, Rue d'Offendorf 1, 67000 Strasbourg; Marcel R. Samsel, Rue Marcel Weinum 10, 67100 Strasbourg, both of France

[21] Appl. No.: 190,942

[22] Filed: Sep. 26, 1980

[30] Foreign Application Priority Data

Jan. 9, 1980 [CH] Switzerland .......................... 124/80

[51] Int. Cl.³ .................................................. G01J 5/48
[52] U.S. Cl. ....................................... 356/44; 264/1.5;
350/96.30; 374/162

[58] Field of Search ..................... 356/44, 43, 45, 418;
350/96.20, 96.30; 73/356; 264/1.5

[56] References Cited

U.S. PATENT DOCUMENTS 4,016,761 4/1977 Rozzell et al. ..................... 356/44 X
4,278,349 7/1981 Sander .................................. 356/44

*Primary Examiner*—Vincent P. McGraw
*Attorney, Agent, or Firm*—Ostrolenk, Faber, Gerb & Soffen

[57] ABSTRACT

The disclosed invention concerns a process for the optical measurement of temperature, a probe device for the carrying out of the process, and a process for producing probe. The probe device contains a pellet of liquid crystals which is contained within an envelope and arranged at the end of an optical fiber. The optical fiber receives light, which is continuously swept by different wavelengths and the light reflected by the liquid crystal is analyzed to detect the reflection peaks and deduce the probe temperature.

14 Claims, 5 Drawing Figures

PROCESS AND DEVICE FOR THE OPTICAL MEASUREMENT OF TEMPERATURE AND PROCESS FOR THE PRODUCTION OF A SUITABLE PROBE

The present invention concerns a process for the optical measurement of temperature employing a source for emitting light within a given range of wavelengths, a light-conducting device for transmitting light within at least a part of the said wavelength range, a cholesterol-crystal probe, and a detection device.

It is also concerns a device for the optical measurement of temperature which comprises a source for emitting light within a given wavelength range, a light-conducting device for transmitting light within at least a part of the said wavelength range, a cholesterol-crystal probe, and a detection device.

Finally, it concerns a process for producing a probe for the optical measurement of temperature, employing a source for emitting light within a given wavelength range, a single optical fiber for transmitting light emitted by said source and swept continuously and uniformly within said wavelength range, and a device for detecting a part of said light of continuously varying wavelengths after reflection on cholesterol crystals.

The problem of measuring temperature in an electromagnetic environment which is sensitive to disturbances produced, for instance, by the conventional thermometers having metal components is well known, particularly in the field of biology.

One of the solutions which has been developed consists in constructing a dielectric probe by recourse to the properties of liquid crystals, and in particular cholesterol crystals which have the ability of reflecting light of a given wavelength when they are brought to a given temperature.

Various more or less experimental devices have been developed to carry out point temperature measurements by means of a probe comprising a pellet of cholesterol crystals arranged at the end of two conductors of light, in particular two optical fibers which are coupled to each other.

At present, all the known devices operate intermittently and use probes having two optical fibers, which in themselves take up a relatively large amount of space. The intermittent measurement on the one hand and the space taken up on the other hand constitute fundamental drawbacks which at present prevent rational use of these apparatus in medicine and biology.

The present invention overcoming these defects by providing a device and developing a method for the use of this device as well as a method for producing a suitable probe in order to effect high precision temperature measurements continuously by means of a probe which takes up very little space and is of very great flexibility. By means of this device, it is possible to monitor and analyze the course of the internal temperature of an organic tissue continuously. The temperature can be displayed by a digital or analog display device. The signal may also be used to permit adjustment by an external contribution of energy, without introducing the disturbances inherent in metallic probes which conduct heat and electricity.

For this purpose, the process of the invention is characterized by filtering the light emitted by the source so as to produce a light which sweeps continuously and uniformly the wavelengths of a wavelength range, by transmitting the light thus produced via a light-conducting device to a cholesterol-crystal probe, by detecting at least a part of the light reflected by the said crystals by means of a detection device and by measuring the temperature in the vicinity of the probe by measuring the shift between a reference signal produced at the start of each sweep cycle and a peak signal corresponding to the maximum reflection of the light on the crystals for a given wavelength of the said wavelength range.

The device in accordance with the invention for the carrying out of this process is characterized by the fact that it comprises a device for filtering the light emitted by a source in order to produce a light which continuously and uniformly sweeps the wavelengths of the said wavelength range; a device for producing a reference signal at the start of each sweep cycle; a device connected to the detection device for producing a peak signal corresponding to each peak value of the amount of light reflected by the crystals and detected by the detector; a device for measuring the shift between the reference signal and the peak signal and for displaying the temperature in the vicinity of the probe as a function of the shift measured; and by the fact that the light-conducting device is formed of a single optical fiber in order to transmit the light incident on the crystals and the light reflected by them.

The process for the production of the optical measurement probe used in the device and for the carrying out of the process is characterized by the fact that an end section of the optical fiber is selectively attacked chemically in such a manner as to form a substantially parabolic cavity within the fiber in the central zone corresponding to the core, by the fact that the protective envelope of synthetic material is stretched so that it extends beyond the transverse fracture surface of said fiber, by the fact that a pellet of cholesterol crystals is deposited in said cavity on the fracture surface, and by the fact that the end of the stretched protective envelope is welded to enclose the crystals within the closed pocket.

The present invention will be better understood by reference to the description of an illustrative embodiment and the accompanying drawings, in which.

As already mentioned, the principle of the temperature detector is based on the properties of cholesterol crystals to cause a Bragg reflection for incident light and therefore to reflect only a wavelength section established by the Bragg condition. As this condition is dependent on the temperature, it is possible, by identification of the wavelength of the reflected light, to determine the temperature of the liquid crystal. Different mixtures of liquid crystals can be established in order to encompass a range of temperature for reflections within the visible or infrared wavelength range. The choice of the mixture will be dictated by the use intended for the probe.

Figure 1:
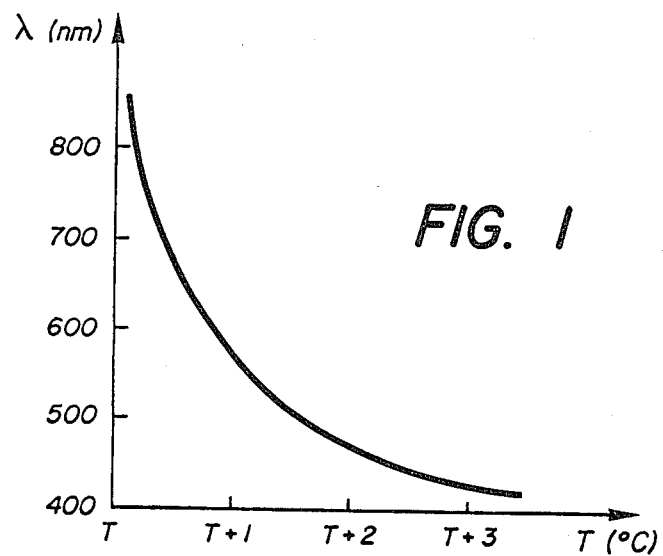
FIG. 1 shows graphically the calibration curve of a cholesterol crystal which can be used in the present invention.

In the example shown in FIG. 1, the calibration curve comprises, on the abscissa, temperatures between T and T+3° C. and on the ordinate, wavelengths of between 400 and 800 nm. This curve is electronically interpreted to determine precisely the temperature at which the probe is as a function of the wavelength for which a reflection peak is observed on the crystal.

Figure 2:
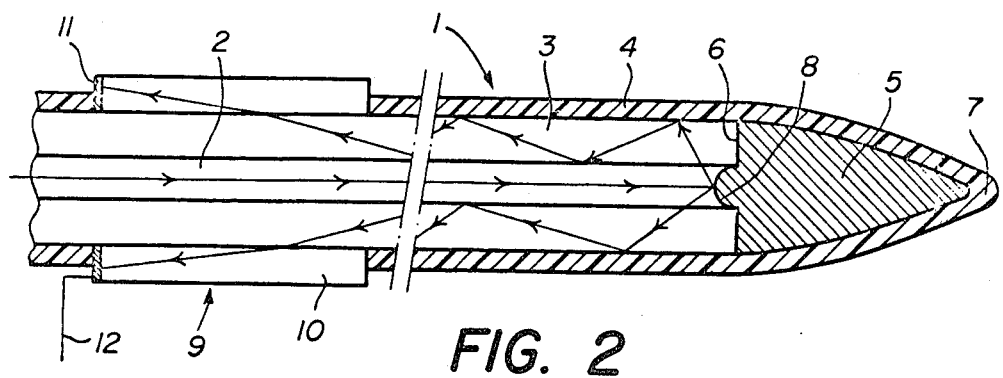
FIG. 2 shows a preferred embodiment of a probe in accordance with the invention.

Referring to FIG. 2, the probe used to effect the measurements which made it possible to draw the previous calibration curve, comprises an optical fiber 1 provided with a core 2, an annular shell 3 surrounding the core 2 and a protective envelope 4 of a flexible synthetic material which constitutes the sheathing of the optical cable. The front end (to the right of the figure) constitutes the probe proper, containing a cholesterol crystal pellet 5 enclosed in the sheathing 4 which has been previously stretched beyond the fracture surface 6 of the fiber 1 and welded a 7. The fracture surface 6 has a central recess 8 obtained by selective chemical attack on the core of the fiber, for instance, by dipping in hydrofluoric acid, in which recess the liquid crystal is, of course, deposited. When light transmitted by the core 2 of the fiber 1 is reflected by the substantially parabolic surface adopted on the pellet 5 of cholesterol crystals which is contained in its vicinity 8, that is to say when the temperature and wavelength conditions correspond to the reflection peak on the crystals, the reflected light penetrates into the shell 3 and is propagated to the detection section (on the left-hand side of the figure). The detector 9 comprises a cylindrical jacket 10, preferably of transparent polymerized resin, the surface of the annular base 11 of which is provided with a layer of a photosensitive material such as silicon. A conductor 12 transmits the signal produced by the detection of a reflection peak to an electronic circuit (not shown) which is capable of determining the temperature at which the probe is by means of a suitable interpretation of the curve illustrated in FIG. 1.

Figure 3:
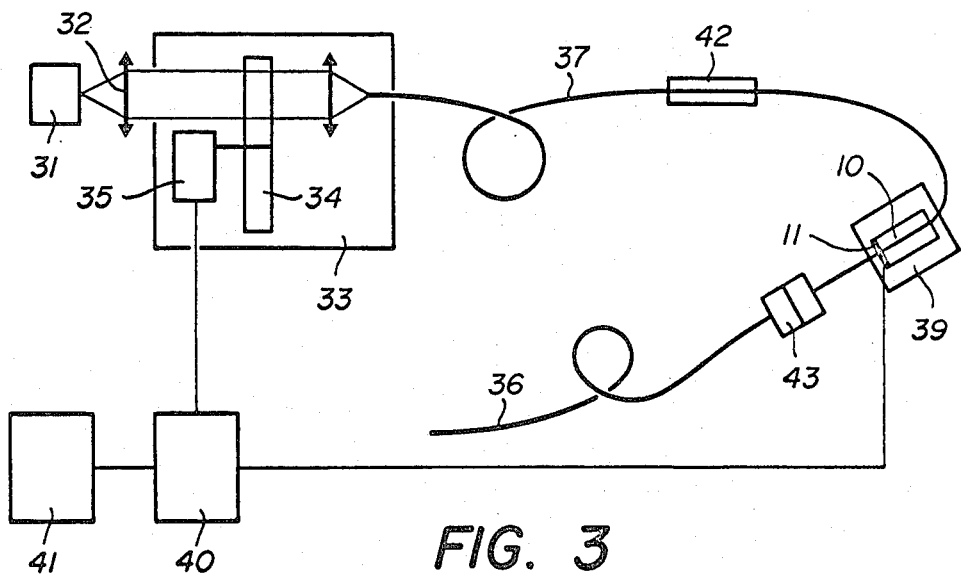
FIG. 3 is an overall view of the device employing the probe of FIG. 2.

FIG. 3 shows a diagram of the entire device for the probe shown in FIG. 2. This device comprises a source of white light 31 and an optical system 32 to develop a parallel beam and to inject said light into an optical fiber 37. In the parallel beam, there is interposed a filter device 33 which is composed preferably of a rotary interference filter 34 driven in continuous and uniform rotation by an electric motor 35 which makes it possible to produce a continuous, uniform wavelength sweep. Detection of the reflected wavelength makes it possible to determine the temperature of the cholesterol crystals of the probe 36. In order to eliminate the light transmitted by the shell of the fiber, recourse is had to a well-known arrangement consisting of surrounding a section of the fiber by a transparent resin cylinder 42. A detector 39, shown diagrammatically, is connected to the probe 36 by means of a connector 43. The detector 39 is composed essentially of a transparent resin cylinder 10 which covers a small section of the optical fiber, and of a photosensitive layer 11. The sensitive layer 11 is connected electrically to an electronic processing unit 40 (not shown in detail) which comprises means for producing a reference signal indicating the start of each sweep cycle and also comprises a device for measuring the shift between the reference signal corresponding to a reflection peak and the signal transmitted by the detector. A digital or analog display device or an inscribing or memory recorder 41 makes it possible to indicate to the user the temperature measured by the probe.

Figure 4:
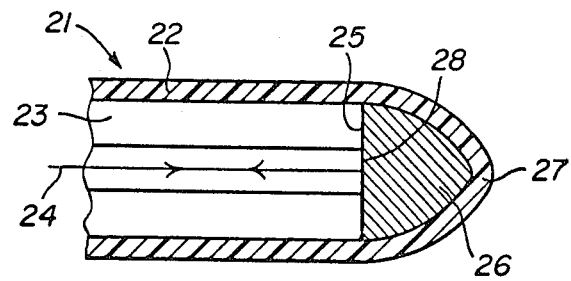
FIG. 4 shows another embodiment of a probe in accordance with the invention.

The probe of FIG. 4 also comprises a single optical fiber 21, sheathed by an envelope 22 which surrounds the jacket 23 and the core 24 of the fiber. The fracture surface 25 is substantially flat. The cholesterol crystals 26 are imprisoned between the fracture surface 25 and the front end of the envelope 22, which is welded at 27. When a probe of this type is used, the incident light transmitted by the core 24 of the fiber is reflected on the flat surface 28 of the liquid crystals. Contrary to what takes place in the probe of FIG. 2, the reflected light is reinjected into the core of the fiber and will be isolated by means of a Y-junction. This arrangement is shown in the overall diagram of FIG. 5.

Figure 5:
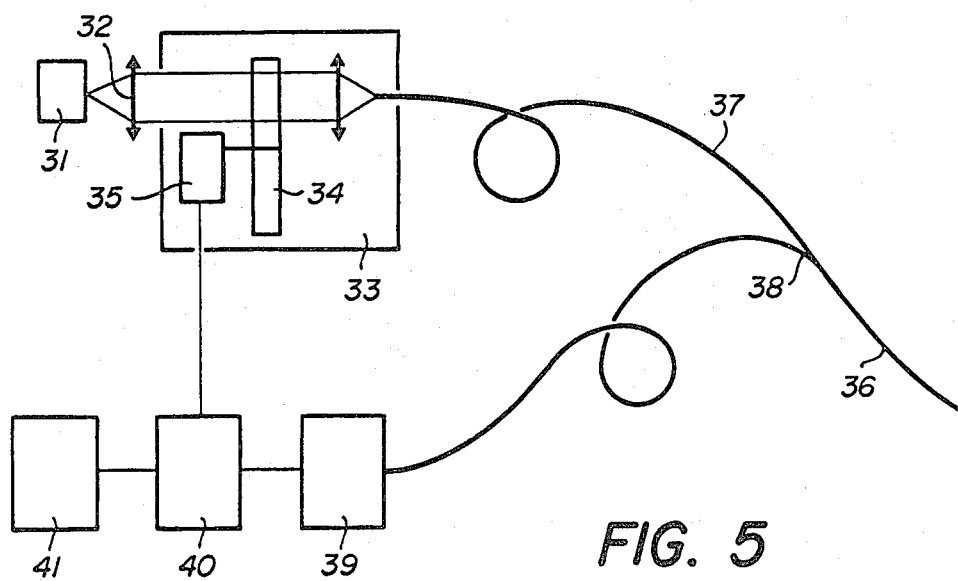
FIG. 5 shows an overall diagram of the device employing the probe of FIG. 4.

FIG. 5 shows diagrammatically the temperature measurement device employing the probe previously described. Although the device shown has a Y-junction used in combination with the probe of FIG. 4, this device also comprises a source of white light, and an optical system making it possible to create a parallel beam and inject it into the optical fiber. In the path of the parallel beam, a circular interference filter will be placed, the transmission wavelength of which varies continuously with the rotation of the filter. The rotation of the filter is assured by an electric motor. This method permits continuous, repetitive wavelength sweeping. It is possible in this way to periodically locate the color of the light reflected and therefore the temperature of the liquid crystal which reflects the monochromatic light injected. Of course, the interference filter could be replaced by any similar apparatus which makes it possible to arrive at the same result. The interference filter 34 defines a range of wavelengths which are transmitted continuously and cyclically by the single optical fiber 37 towards the cholesterol crystals of the probe 36. For each temperature of the probe, there corresponds a wavelength value for which the crystals reflect a maximum amount of light, that is to say for which a reflection peak is observed. The light reflected is partially transmitted by the Y-junction 38 to the detector 39, which is formed, for instance, of a photosensitive cell whose role is to detect the successive reflection peaks.

An electronic processing unit 40 (not shown in detail) comprises a device for producing a reference signal which indicates the start of each sweep cycle. This device may comprise any pulse generator in phase with the rotation of the motor, adapted to produce one pulse per revolution of the interference filter 34. It also comprises a device for measuring the shift between the reference signal and the signal transmitted by the detector corresponding to a reflection peak. The shift can be determined by a measurement of the time interval between the two signals or by a phase-shift measurement, or by any other suitable measurement. Finally, it comprises an electronic circuit which makes it possible to interpret the curve of FIG. 1, which corresponds to the crystals used in the probe 36. A digital display device 41 indicates the precise temperature at which the probe is, upon each rotation of the interference filter.

The device of this invention makes it possible to measure the temperature of a body very accurately in any medium and to monitor the change in this temperature in the course of time.

What is claimed is:

1. A process for the optical measurement of temperature employing a source for emitting light in a given range of wavelengths, a light-conductive device for transmitting light within at least a part of the wavelength range, a cholesterol-crystal probe and a detector device, characterized by filtering the light emitted by the source so as to produce a light which sweeps continuously and uniformly said range of wavelengths, transmitting the light thus produced through said light conductive device to the said cholesterol-crystal probe, detecting at least a part of the light reflected by the said crystals by said detection device, and measuring the temperature in the vicinity of the probe by measuring the sift between a reference signal produced at the start of each sweep cycle and a peak signal corresponding to the maximum reflection of the light on the crystals for a given wavelength of the said wavelength range.

2. A process according to claim 1, characterized by the shift between the reference signal and the peak signal being measured by a time measurement.

3. A process according to claim 1, characterized by the shift between the reference signal and the peak signal being measured by a phase-shift measurement.

4. A process according to claim 1, characterized by measuring said light with continuous variation of the wavelength at the probe and collecting the light reflected by the crystals by means of a single optical fiber.

5. A process according to claim 4, characterized by transmitting the light incident on the cholesterol crystals by the core of said single optical fiber and the light reflected on the detection device by the shell of said fiber.

6. A process according to claim 4, characterized by transmitting the light incident on the cholesterol crystals by the center of the single optical fiber, collecting the light reflected in the center of said fiber, and transmitting at least a part of the reflected light to the detector by means of a second optical fiber connected to the first by means of a Y-junction at a place distant from the cholesterol-crystal probe.

7. A device for the optical measurement of temperature comprising source means for emitting light in a given wavelength range; a light-conducting means for transmitting light in a least a part of the said wavelength ranges; a cholesterol-crystal probe; detection means; filtering means for the light emitted by the source so as to produce a light which sweeps continuously and uniformly the wavelengths of said wavelength range; means for producing a reference signal at the start of each sweep cycle; means connected to the detection means to produce a peak signal corresponding to each peak value of the amount of light reflected by the said crystals and detected by said detection means; means for measuring the shift between the reference signal and the peak signal and for displaying the temperature in the vicinity of the probe as a function of the shift measured; said light-conducting device formed of a single optical fiber in order to transmit the light incident on the crystals and the light relfected by the crystals.

8. A device according to claim 7, characterized by said probe comprising a pellet of cholesterol crystals arranged at the end of the end section of the said fiber in contact with the transverse fracture surface thereof and within a protective envelope closed at its end.

9. A device according to claim 8, characterized by the transverse fracture surface of the end section of the fiber being substantially flat.

10. A device according to claim 8, characterized by the transverse fracture surface of the end section of the fiber comprising a central recess which penetrates into the interior of the fiber in its central zone corresponding to the core.

11. A device according to claim 7, characterized by the filtering means comprised of a circular interference filter with continuous variation of wavelength driven in uniform rotation aroung its axis.

12. A device according to claim 7, characterized by the detection means comprising a silicon photoelectric cell.

13. A device according to claim 7 characterized by the detection means comprising a photomultiplier.

14. A process for producing a probe for optical measurement of temperature employing a source for emitting light within a given wavelength range, a single optical fiber for transmitting light emitted by said source and swept continuously and uniformly in wavelength within the said wavelength range, and a means for detecting a part of said light of continuously varying wavelength after reflection on cholesterol crystals, characterized by selectivity chemically attacking the end section of the optical fiber in such a manner as to form a substantially parabolic cavity within the fiber in the central zone corresponding to the core, stretching the protective envelope of synthetic material so that it extends beyond the transverse fracture surface of said fiber, depositing a pellet of cholesterol crystals in said cavity on the fracture surface, and welding the end of the stretched protection envelope to enclose the crystals within the closed pocket.

* * * * *

UNITED STATES PATENT AND TRADEMARK OFFICE
CERTIFICATE OF CORRECTION

PATENT NO. : 4,357,106
DATED : November 2, 1982
INVENTOR(S) : Jean D. Tschirren, et al It is certified that error appears in the above-identified patent and that said Letters Patent are hereby corrected as shown below:

In the Headings read -- Assignee: Ciposa, S.A. --

Column 1, line 13, delete "is".

Column 3, line 18, for "a 7" read -- at 7 --; line 26, for "vicinity" read -- cavity --.

Column 5, line 39, for "a", first occurrence, read - at -.

Column 6, line 6, for "relfected" read -- reflected --; line 24, for "aroung" read -- around --; line 38, for "selectivity" read -- selectively --.

Signed and Sealed this

First Day of February 1983

[SEAL]

Attest:

GERALD J. MOSSINGHOFF

Attesting Officer

Commissioner of Patents and Trademarks